Feb. 8, 1949. I. L. YOUNG 2,460,963
CASING CLOSURE
Filed Sept. 29, 1943
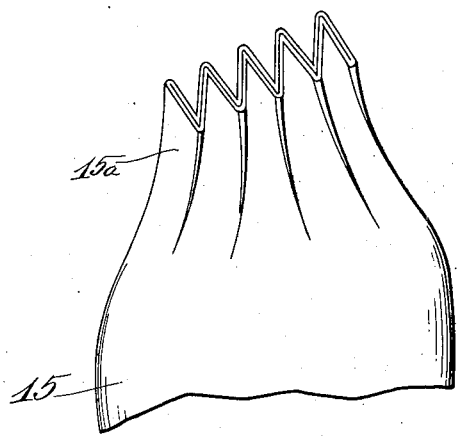
Fig. 1.
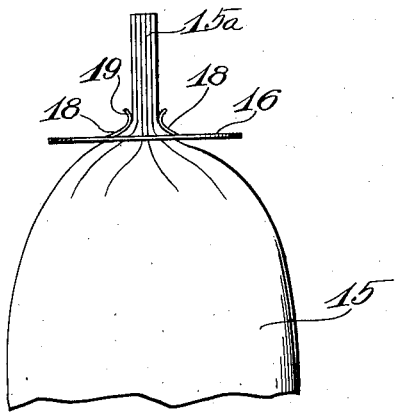
Fig. 2.
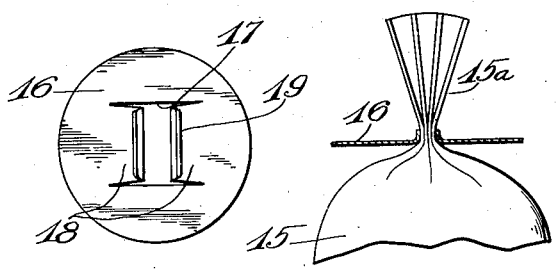
Fig. 3. Fig. 4. Fig. 5.
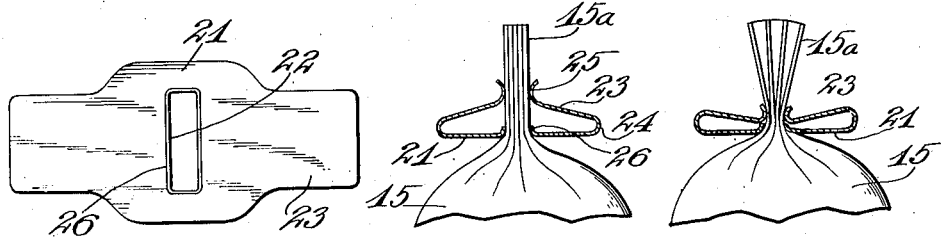
Fig. 6. Fig. 7. Fig. 8.
Irvin L. Young
INVENTOR.
BY Stevens & Batchelor
Attorneys.

Patented Feb. 8, 1949

2,460,963

UNITED STATES PATENT OFFICE 2,460,963

CASING CLOSURE

Irvin L. Young, Chicago, Ill.

Application September 29, 1943, Serial No. 504,327

4 Claims. (Cl. 24—30.5)

My invention relates to flexible casings in which foods or other products are packed or dispensed. Casings of this character are usually made in tubular form and require tight closures in order to withstand the packing of foods under pressure or to prevent leakage from foods which have or develop a liquid content. Thus, casings of the type contemplated may be formed from animal matter, or even cloth or paper; however, artificial casings of wet or dry cellulose are largely used for sausages, meat loaf and other stuffed or packed products.

Without dwelling on the primitive or makeshift methods for closing casings of the type considered, it may be said that a common method for effecting a closure is to gather each end of the casing into the form of a solid stem, bend the latter over and tie it tightly around. In some cases, the gather is by means of a series of accordion folds made from the flattened casing, the group of folds assuming the form of the solid stem. While this form of closure may be considered as satisfactory, it still has the ear-marks of a manual attempt or makeshift to secure the desirable result.

It is one object of my invention to incorporate a mechanical clamping factor in the gathered closure of the casing which will assure the tightness of the same permanently. A further object is to provide a clip which is neat, compact and sanitary. An additional object is to construct the clip in a single piece for utmost economy in manufacture and ease in handling.

With the above objects in view, and any others which may suggest themselves from the description to follow, a better understanding of the invention may be had by reference to the accompanying drawing, in which—

Fig. 1 is a perspective view of one end of a tubular casing as initially formed to make the closure;

Fig. 2 is an elevation, showing one form of the clip applied to the gathered end of the casing;

Fig. 3 is a top plan view of the clip;

Fig. 4 is a view similar to Fig. 2, showing the clip tightened or clamped on the end portion of the casing;

Fig. 5 is a vertical section, showing a modification of the clip illustrated in Fig. 3;

Fig. 6 is a top plan view of a modified form of clip;

Fig. 7 is an elevation showing the modified clip applied to the end portion of the casing; and Fig. 8 is a view similar to Fig. 7 showing the modified clip in the engaged or clamped position.

Referring specifically to the drawing, Fig. 1 shows that the casing 15 is gathered at one end with a series of accordion folds 15a in order that such end may be compactly grouped, as indicated in Fig. 2, before the clip is applied to secure the gathered portion of the casing.

The form of clip shown in Fig. 2 is primarily a plate 16 of sheet metal, such plate being cut with an internal opening 17 to define a pair of opposed tongues 18. When the plate is in the horizontal position shown in Fig. 2, the normal position of the tongues 18 is with an upward approach toward each other, the tongues then terminating with outward curls 19.

Fig. 2 shows that the gathered portion 15a of the casing 15 has been passed through the clip, such gathered portion having been slid between the curls 19. It is only necessary now to press downwardly upon the tongues 18 in order to secure the clip. As indicated in Fig. 4, the downward pressure to return the tongues to the level of the plate 16 causes the curls 19 to constrict the gathered portion 15a, securing a tight closure for the affected end of the casing. It is understood that the material of the plate 16 will be fairly hard, yet capable of being bent by manual pressure, such as by the application of the thumbs of the hands to the tongues 18. Thus, when the tongues have once been depressed they will be sufficiently firm to maintain their positions of engagement and pressure in respect to the gathered casing portion 15a. Fig. 3 shows that the tongues 18 are somewhat tapered inwardly, so that sufficient clearance may be afforded them when they are pressed down to the level of the plate.

The modification of Fig. 5 is quite similar to the main form, except that the curls 19 are dispensed with. Instead, the tongues 20 are rounded at their forward edges, so that when they are pressed into engagement with the casing they will not cut the same. Naturally, the form of Fig. 2 will be employed where the casing is thin or of a light material, while the form of Fig. 5 may be applied to a casing of heavier or tougher material.

The modification of Fig. 6 involves a base plate 21 having a slot 22 in the center and extensions 23 on opposite sides when in the blank form.

In order to form the clip, the extensions 23 are roundedly bent up and inwardly as indicated at 24 in Fig. 7; and their terminals are formed with outward curls 25. The opening 22 is formed with a rounded upward rim 26.

Fig. 7 shows the manner in which the clip is applied to the casing. It is apparent that the rounded rim 26 facilitates the insertion of the gathered portion 15a of the casing; and the extensions 23 assume inclined positions in respect to the base of the clip. However, when the clip is to be made fast, the said extensions are pressed down to the positions indicated in Fig. 8, so that the gathered portion of the casing is firmly clamped between the curls 25. Also, these will remain in the depressed positions because of passing below the imaginary center line between the outer ends of the extensions 23.

It will be evident from the above description that I have provided a clip which in any of its three forms is a simple, and easily applied device. Further, the clip is of a nature to be pressed against the gathered portion of the casing in a manner to tightly close the same. The gradual incline of the extensions 23 renders them responsive as toggles to the pressure of the fingers to procure clamping action by the curls 25, so that an ordinary amount of pressure suffices to procure a tight and permanent hold on the affected portion of the casing. Finally, the novel clip is in a single piece, of a compact size and form and of a nature to be economically produced.

While I have described the various forms of invention along specific lines, various minor changes and refinements may be made without departing from its principle, and I desire to consider all such changes and refinements as coming within the scope and spirit of the appended claims.

I claim:

1. A clip for the gathered end portion of a sausage casing where such end portion presents flat opposite sides comprising a plate of flexible sheet material formed with an opening for the passage of said portion, and a pair of extensions arranged on opposite sides of said plate, said extensions bent back toward the opening in said plate to press against the gathered end portion of the casing.

2. The structure of claim 1, said extensions being employed as toggles to clamp the casing, and the terminal ends of said extensions provided with reversed curved jaw portions.

3. A one-piece flexible clip comprising a base plate having a central opening therein for receiving a gathered end portion of a sausage casing, a pair of extensions arranged on opposite sides of said plate, said extensions roundedly bent up and turned inwardly toward the central opening to press against the gathered end of the sausage casing, the terminal ends of said extensions provided with outwardly curved portions.

4. The structure of claim 3, said inwardly bent extensions serving as clamping toggles and lying substantially horizontally with respect to the base plate when in clamping position.

IRVIN L. YOUNG.

REFERENCES CITED

The following references are of record in the file of this patent:

UNITED STATES PATENTS

| Number | Name | Date |
|---|---|---|
| 1,242,139 | Callahan | Oct. 9, 1917 |
| 1,909,126 | Satterthwaite | May 16, 1933 |
| 1,968,221 | Reiter | July 31, 1934 |
| 1,997,048 | Demmy | Apr. 9, 1935 |
| 2,112,477 | Brownfield | Mar. 29, 1938 |

FOREIGN PATENTS

| Number | Country | Date |
|---|---|---|
| 136,217 | Australia | Jan. 10, 1934 |
| 383,123 | Germany | Oct. 16, 1923 |